(12) United States Patent
Jeunen

(10) Patent No.: US 10,019,647 B2
(45) Date of Patent: Jul. 10, 2018

(54) DISPENSER

(71) Applicant: Carlo Mark Jozef Jeunen, Hoeselt (BE)

(72) Inventor: Carlo Mark Jozef Jeunen, Hoeselt (BE)

( * ) Notice: Subject to any disclaimer, the term of this patent is extended or adjusted under 35 U.S.C. 154(b) by 77 days.

(21) Appl. No.: 15/036,580

(22) PCT Filed: Nov. 14, 2014

(86) PCT No.: PCT/BE2014/000063
§ 371 (c)(1),
(2) Date: May 13, 2016

(87) PCT Pub. No.: WO2015/070294
PCT Pub. Date: May 21, 2015

(65) Prior Publication Data
US 2016/0292534 A1 Oct. 6, 2016

(30) Foreign Application Priority Data

Nov. 15, 2013 (BE) .................................... 2013/0773

(51) Int. Cl.
| | |
|---|---|
| *G06K 9/00* | (2006.01) |
| *G06K 9/62* | (2006.01) |
| *G06T 7/00* | (2017.01) |
| *A47K 5/12* | (2006.01) |
| *A47K 10/36* | (2006.01) |

(Continued)

(52) U.S. Cl.
CPC ............ *G06K 9/621* (2013.01); *A47K 5/1217* (2013.01); *A47K 10/3662* (2013.01); *A47K 10/38* (2013.01); *A47K 10/3845* (2013.01); *G06K 9/00335* (2013.01); *G06K 9/52* (2013.01); *G06T 7/001* (2013.01); *G06T 7/20* (2013.01); *G06T 7/60* (2013.01); *G07F 9/02* (2013.01); *H04N 5/2256* (2013.01); *H04N 7/18* (2013.01); *A47K 5/14* (2013.01); *A47K 2010/3226* (2013.01);

(Continued)

(58) Field of Classification Search
None
See application file for complete search history.

(56) References Cited

U.S. PATENT DOCUMENTS

| | | | |
|---|---|---|---|
| 5,781,708 A * | 7/1998 | Austin ................... | B41J 11/009 235/375 |
| 2006/0088196 A1 * | 4/2006 | Popovich, Jr. .......... | G06T 7/001 382/128 |

(Continued)

FOREIGN PATENT DOCUMENTS

WO     WO2005088517 A1     9/2005

*Primary Examiner* — Nancy Bitar
(74) *Attorney, Agent, or Firm* — Rudy J. Ng; Bret E. Field; Bozicevic, Field & Francis LLP

(57) ABSTRACT

Dispenser with a frame which comprises a dispensing mechanism with filling for the purpose of dispensing a predetermined quantity of the filling, wherein the dispenser further comprises a camera, a processor and a memory, wherein the camera can form an image of at least a portion of the filling, wherein a predetermined reference image is stored in the memory, and wherein the processor is provided for the purpose of determining a similarity between image and reference image, wherein the processor is further provided for the purpose of stopping the dispensing mechanism when said similarity lies below a predetermined value.

12 Claims, 3 Drawing Sheets

(51) Int. Cl.
  *A47K 10/38*  (2006.01)
  *G07F 9/02*  (2006.01)
  *G06K 9/52*  (2006.01)
  *G06T 7/20*  (2017.01)
  *G06T 7/60*  (2017.01)
  *H04N 5/225*  (2006.01)
  *H04N 7/18*  (2006.01)
  *A47K 5/14*  (2006.01)
  *A47K 10/32*  (2006.01)

(52) U.S. Cl.
  CPC .................. *A47K 2010/389* (2013.01); *G06T 2207/30124* (2013.01)

(56)  References Cited

U.S. PATENT DOCUMENTS

2015/0127145 A1* 5/2015 Kim .................... G06F 19/3462
  700/235
  2016/0358325 A1* 12/2016 Ishimaru .............. G06K 9/4604

\* cited by examiner

DISPENSER

The present invention relates to a dispenser comprising a frame for receiving a filling. The frame has a dispensing mechanism here for delivering a predetermined quantity of the filling outside the frame.

Dispensers are generally known and are used for diverse applications. Dispensers are thus known for dispensing paper, for instance in public toilets. Further known are dispensers for dispensing a liquid such as a soap or disinfectant gel. Such dispensers are filled with a filling (paper, soap) which is typically delivered in small quantities to a user by being dispensed in predetermined quantities outside the frame.

Dispensers are typically designed for co-action with one predetermined type of filling. This filling is designed such that, when the filling (in the frame of the dispenser) is empty, it can be replaced in simple manner with a fresh filling without the whole dispenser having to be replaced. The highest turnovers in the market for dispensers and fillings are realized by sales of the fillings. For this reason fillings will in practice often be imitated. These imitation fillings also claim to be compatible with the dispenser, although in practice the imitation fillings differ technically from the genuine fillings. A user of such dispensers can easily be deceived in practice when placing the new filling and place an imitation filling instead of a genuine filling. Owners of dispensers often also opt to place imitation fillings in the dispenser because they are typically cheaper than genuine fillings. Because the imitation filling is seldom technically identical to the genuine filling, placing of such an imitation filling can have an adverse effect on the operation of the dispenser. A blockage can thus occur during dispensing of a predetermined quantity of the filling, the filling can jam in the dispenser or the filling can damage the dispensing mechanism. Not only is this uncomfortable for the user of the dispenser, it will also be particularly disadvantageous for the manufacturer of the dispenser. This is because the dispenser is typically provided with a brand name, so that the user has a point of reference when using the dispenser. The filling is typically located here in the frame of the dispenser and is not usually visible to the user. When an imitation filling is placed and the user is confronted with a dispenser which does not work or does not work properly, the user will associate this negative experience with the brand designation on the dispenser. This will cause damage to the brand.

In order to prevent poor operation of the dispenser and limit the associated brand damage, different solutions have been devised for preventing placing of imitation fillings in dispensers. The shape of the filling can thus be adapted to the shape of the dispenser, wherein this shape is specifically designed so that only fillings of the predetermined shape fit into the dispenser. It is found in practice however that such a shaping is copied by manufacturers of imitation fillings. Alternatively, a chip (electronic circuit) can be placed in the filling which communicates with an electronic circuit in the dispenser when the filling is placed in the dispenser. The dispenser can detect via such a chip whether the filling is a genuine filling. The drawback of a chip is the cost price, particularly when many fillings are used.

It is an object of the present invention to provide a dispenser which is designed such as to minimize poor operation of and damage to the dispenser as a result of a non-genuine filling being placed therein.

The dispenser according to the invention comprises for this purpose a frame suitable for receiving a filling, wherein the frame comprises a dispensing mechanism for the purpose, when the filling is fitted in the frame, of dispensing a predetermined quantity of the filling outside the frame, characterized in that the dispenser further comprises a camera, a processor and a memory, wherein the camera is placed in the frame such that, when the filling is fitted in the frame, the camera is suitable for forming an image of at least a portion of the filling, wherein at least one predetermined reference image is stored in the memory, and wherein the processor is connected operationally to the camera, the memory and the dispensing mechanism and is provided for the purpose of determining a similarity between said image and said reference image, wherein the processor is further provided for the purpose of stopping the dispensing mechanism when said similarity lies below a predetermined value.

In the dispenser according to the invention a visual check is performed on the filling placed therein. Performing a visual check has several advantageous effects. First and foremost a visual check in the dispenser will allow detection of an imitation filling and stopping of the dispensing mechanism. Damage to the dispenser resulting from further use of the wrong filling can hereby be prevented. A further unexpected advantage is that it is much more difficult for a manufacturer of imitation fillings to produce a filling of the type suitable for the dispenser. In the case of a filling with an exterior shaped in a particular manner so as to fit into a dispenser (prior art) it is easy for a manufacturer of imitation fillings to examine and imitate this shape (the shape is at least largely visible). When however a visual check is carried out, it is not immediately obvious which visual characteristics of the filling are being checked. The manufacturer of imitation fillings would for this purpose have to read out the memory of the dispenser and combine this with the camera characteristics and the algorithms used in the processor to check the similarity in order to find the specific visual characteristics for which the dispenser checks the filling. This will raise the bar appreciably for the manufacturer of imitation fillings. This will drastically reduce the availability of imitation fillings on the market and significantly reduce the chance of a user accidentally placing an imitation filling in the dispenser. Poor operation of and damage to the dispenser are thus minimized directly (by stopping the dispensing mechanism) and indirectly (by affecting the availability of imitation fillings on the market).

A protected image or brand name on the filling can be checked by performing the visual check. A manufacturer of imitation fillings which arranges such a protected image or brand name on the imitation fillings in order to make them compatible with the dispenser will infringe upon intellectual property rights of the manufacturer of the genuine fillings. The availability of imitation fillings on the market can hereby be further limited, thereby further minimizing the chance of a dispenser operating poorly because an imitation filling has been placed therein.

The camera is preferably placed in the frame at a distance of at least 1.0 cm, preferably 2.0 cm, from said portion of the filling when the filling is fitted in the frame. A dispenser is designed to bring about a mechanical interaction between filling and dispenser in order to dispense a quantity of the filling to the outside. There will therefore always be a close physical contact between filling and dispenser. In the prior art this close physical contact has always been the basis for preventing and/or detecting imitation fillings in the dispenser (for instance by the specific shaping of the contact surface or by providing a chip which makes contact with an electronic circuit). The present invention moves away from the idea of using the contact between filling and dispenser as basis for detecting an imitation filling. A space, whereby the camera can form from a distance an image of the portion of the filling, is created in the invention at least at one location in the dispenser, being the location where the portion of the filling for forming the image via the camera is situated. A good imaging can take place by creating this space and the distance between the camera and the filling.

A light source is preferably provided in the frame for illuminating the portion of the filling when the filling is fitted in the frame. Providing a light source considerably simplifies the forming of an image with a camera. This is because a stable, constant and pre-known lighting of the portion of the filling is obtained via the light source, whereby a stable image recording is also obtained. When a stable image is formed, further processing of this image by the processor (comparison to the reference image) will be significantly simpler.

Said portion of the filling preferably makes a movement in the frame when the dispensing mechanism dispenses the predetermined quantity of the filling. Said portion of the filling is defined here as the portion of which the camera forms an image. By causing this portion to move a dynamic image is formed and said portion of the filling from which an image is formed will advance each time the dispensing mechanism dispenses filling. The visual check will hereby not only monitor one predetermined zone of the filling but, due to the movement, a greater part of the filling will be visually checked. The check is hereby extended.

The camera is preferably a line camera which is provided for the purpose of forming an image during said movement. A line camera is inexpensive and typically has a high resolution. A line camera is highly suitable for forming an image of a moving object.

The dispensing mechanism preferably comprises an operating element for the purpose of starting the dispensing of a predetermined quantity of said filling. A user can operate the dispenser via the operating element in order to receive a filling.

The operating element preferably comprises an electronic circuit for controlling the dispensing mechanism. The processor is more preferably connected operationally to the electronic circuit for the purpose of stopping the dispensing mechanism. When the dispenser comprises an electronic circuit which provides for control of the dispensing mechanism, and this electronic circuit is further connected to the processor in order to stop the dispensing mechanism when the filling is found to be an imitation filling, modification of the dispenser in order to bypass the security system will be difficult. The security system can in this way be integrated into the control of the dispenser.

The dispenser preferably comprises a blocking element and the processor is provided for the purpose of stopping the dispensing mechanism by controlling the blocking element. The mechanical operation of the dispenser can be physically blocked via a blocking element. It is hereby possible to prevent damage to the dispenser through further operation of the dispensing mechanism in co-action with the imitation filling.

The dispenser is preferably a roll dispenser wherein the dispensing mechanism is formed as the unrolling mechanism for unrolling a filling roll in order to dispense a predetermined quantity of sheet-like material (i.e. the filling) from the filling roll to the outside. Roll dispensers are applied frequently in public conveniences such as at road services, hotels, office buildings and so on. The camera is preferably directed here at the sheet-like material when a filling roll is fitted in the frame. The sheet-like material is hereby checked visually. This means that the sheet-like material has specific visual characteristics which are compared to reference characteristics (the reference image) in order to establish a similarity. On the basis of this similarity an assessment is made by the dispenser as to whether the filling roll is genuine or imitation.

In a further embodiment the dispenser is a liquid dispenser wherein the frame is adapted to comprise a liquid container, wherein the camera is directed at the liquid container. A visual check of the liquid container can in this way be carried out in order to check whether the container is genuine or imitation.

The invention further relates to the assembly of a camera, a processor and a memory, wherein the camera is adapted for placing in the frame of a dispenser with filling, wherein the camera is adapted to form an image of at least a portion of the filling, wherein at least one predetermined reference image is stored in the memory and wherein the processor is connected operationally to the camera, the memory and is provided for connection to a dispensing mechanism, wherein the processor is further provided so as to determine similarity between said image and said reference image and is provided so as to stop the dispensing mechanism when said similarity is below a predetermined value. Via such an assembly an existing dispenser can be converted to a dispenser according to the invention, the advantages and effects of which have been described at length above.

The invention further relates to a method for stopping a dispensing mechanism of a dispenser, wherein the method comprises of:
  forming an image of at least a portion of the filling which has been placed in the dispenser;
  comparing the image to a reference image in order to determine a similarity between the image and the reference image;
  stopping the dispensing mechanism when the similarity is below a predetermined value.

Via the method for stopping a dispensing mechanism it is possible to prevent a dispenser operating poorly or being damaged because an imitation filling is placed therein. This takes place according to the invention on the basis of a visual check of the filling. The advantages and effects of applying a visual check have been discussed at length above.

The similarity is preferably calculated by:
  defining the similarity at a predetermined initial value when a filling is placed;
  subtracting a first predetermined value when the image differs from the reference image during dispensing of a predetermined quantity of the filling;
  adding a second predetermined value when the image corresponds to the reference image during dispensing of a predetermined quantity of the filling.

By calculating in this way the similarity between reference image and the image recorded by the camera a jamming of the dispenser on the basis of an irregularity in the genuine filling (whereby a relatively small dissimilarity results between image and reference image) is minimized. This is because the similarity is calculated over a longer period in different steps (wherein each dispensing of filling is a step). The first predetermined value and second predetermined value can be selected here such that a similarity in one step is sufficient to compensate a dissimilarity in for instance twenty following steps. Similarity of a detail component of the filling can hereby be used in order to check the genuineness of the filling. This provides many possibilities to designers of such a blocking system for a dispenser.

The invention will now be further described on the basis of an exemplary embodiment shown in the drawing.

In the drawing.

The same or similar elements are designated in the drawing with the same reference numeral.

Figure 1:
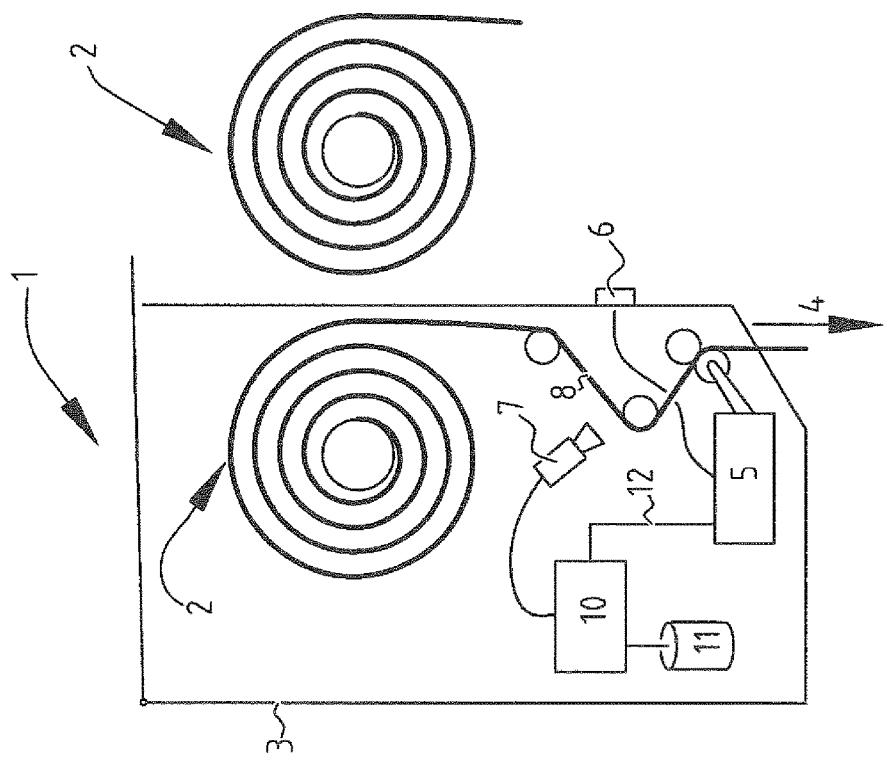
FIG. 1 shows a first embodiment of a dispenser according to the invention with associated filling.

FIG. 1 shows a dispenser 1 with a frame 3 provided for the purpose of holding a filling 2. Frame 3 preferably encloses the whole filling 2 once filling 2 has been placed in the frame. Frame 3 further comprises here a dispensing mechanism 5 for dispensing to the outside 4 a predetermined quantity of filling 2. In the embodiment shown in FIG. 1 the dispenser 1 is a roll dispenser. Filling 2 is a roll, for instance a paper roll. A towel roll or a linen roll can also be provided as alternative to a paper roll. Dispensing mechanism 5 is provided for the purpose of driving an internal guide roller (over which the paper of filling 2 is guided) so as to thus move a predetermined quantity of the paper to the outside 4. The driving of the guide roll by dispensing mechanism 5 is preferably initiated here by operating a button 6. This button 6 is placed on an outer side of frame 3 of dispenser 1 such that a user can operate the button 6 in simple manner. A proximity sensor can also be provided as alternative to a button 6 such that a user can operate dispensing mechanism 5 by moving into the vicinity of proximity sensor 6. Button 6 is preferably connected via an electronic circuit to dispensing mechanism 5 for operation of this latter. The electronic circuit can further be provided here with logic for optimum operation of dispensing mechanism 5.

Frame 3 of dispenser 1 is formed such that fillings 2 can be replaced easily. This is illustrated in FIG. 1 by a pivotable cover on frame 3. FIG. 1 shows on the right of the figure a fresh filling which can be placed in frame 3 when the filling in frame 3 is due for replacement (is empty or almost empty).

It will be apparent to the skilled person that the guide rollers illustrated in FIG. 1 serve only to illustrate the guiding of the paper in the dispenser, and that the invention is not limited to one or other form of guiding of the paper in the dispenser. Any method of guiding the paper in the dispenser is suitable for application of the invention. Mechanical dispensing systems are thus available on the market wherein a user can pull the paper via the outside 4 and thus remove a predetermined quantity of filling 2 from dispenser 1. Such a dispensing mechanism 5 operates without active driving and without button 6. The invention can likewise be applied to such a mechanical and passive dispensing mechanism. While an active (electronic) dispensing mechanism as shown in FIG. 1 can be stopped in electronic manner (i.e. a stop signal is received in the electronics of dispensing mechanism 5), a passive dispensing mechanism can be stopped via a blocking element (not shown) which can be operated and which can block the dispensing mechanism mechanically. An active (electronic) dispensing mechanism can also be stopped via a blocking element.

Dispenser 1 according to the invention further comprises a camera 7 which is directed at a predetermined portion 8 of filling 2. In FIG. 1 camera 7 is directed at a portion of the paper which is delivered to the outside 4. The precise operation hereof and advantages will be described below with reference to FIG. 2. Camera 7 here forms images of at least a portion of filling 2. Camera 7 is operationally connected to a processor 10. Processor 10 is connected to a memory 11 or comprises an internal memory in which one or more reference images are stored. Processor 10 is provided here for the purpose of comparing the images from camera 7 to the reference images from memory 11. Comparison of images is generally known and different algorithms can be applied for the purpose of determining a similarity or a degree of similarity. On the basis of the similarity determined by processor 10 between the images from camera 7 and the reference images from memory 11 it is possible to determine whether filling 2 is a genuine filling and whether it is an imitation filling. When processor 10 detects that filling 2 is an imitation filling, in that the similarity between the images from camera 7 and reference images 11 is below a predetermined value, dispensing mechanism 5 is stopped. Processor 10 is provided for sending 12 a stop signal to the dispensing mechanism for this purpose. In the above described alternative example of a mechanical dispensing mechanism the processor is provided for controlling the blocking element such that the blocking element blocks the dispensing mechanism. Via camera 7 and processor 10 a visual check is performed on filling 2, and the dispenser can be stopped when the filling is found to be an imitation filling. Poor operation of or damage to dispenser 1 can hereby be prevented.

FIG. 1 shows how there is a distance between camera 7 and the portion of filling 8 at which the camera is directed. This distance allows a consistent image of filling 2 to be formed via camera 7. This distance also allows placing of a light source (not shown) for illuminating the portion 8 of filling 2. A constant illumination via a light source with predetermined properties in combination with a distance between the camera and portion 8 of the filling allows a reliable image to be formed which can be compared with high reliability to reference images in memory 11.

Figure 2:
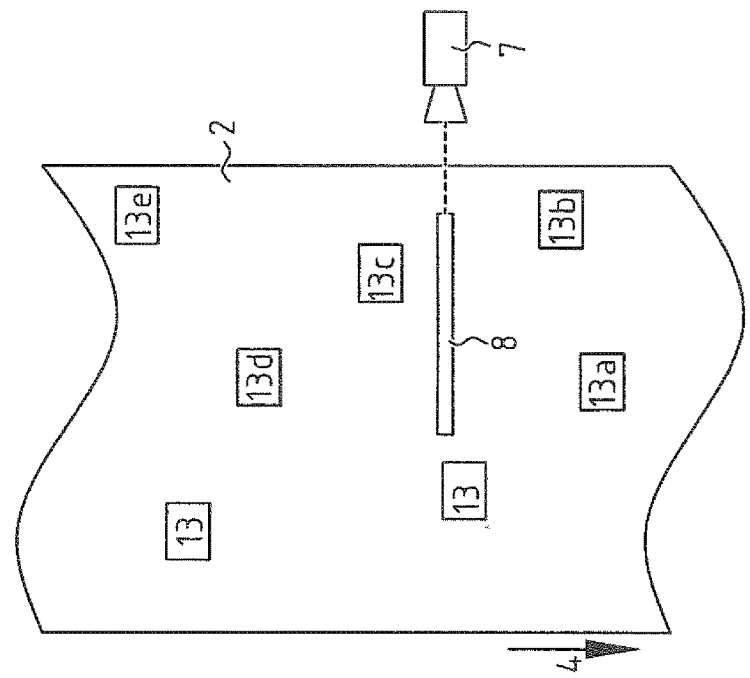
FIG. 2 shows an illustration of a possible implementation of visual checking in the first embodiment of FIG. 1.

FIG. 2 shows a strip of the paper of filling 2 from FIG. 1. FIG. 2 shows here camera 7 which forms an image of filling 2. Camera 7 is a line camera. In the embodiment of FIG. 1 the paper (the filling) moves past camera 7 when the dispensing mechanism dispenses paper. This movement of the paper past camera 7 allows an image of the paper of filling 2 to be formed via a line camera. FIG. 2 shows how camera 7 is directed at a predetermined portion 8 of filling 2. Because camera 7 is a line camera, the predetermined portion 8 is very small in height, although because the paper is moving past camera 7 the camera can nevertheless form a complete image of filling 2 by successively recording linear images. It is not necessary here for the predetermined portion 8 to extend over the full width of filling 2. The ideal width of the predetermined portion 8 viewed by camera 7 depends on the visual characteristics with which the comparison takes place in processor 10. In the example of FIG. 2 printed images 13 are placed on the paper of filling 2 with a predetermined spacing (wherein the spacing can vary within specific predetermined limits). Printed images 13 can here be the same or differing, optionally copyright-protected images, or printed images 13 can be printed images of a logo, for instance the logo of the manufacturer of dispenser 1. Printed image 13 can also be a brand name, for instance of the manufacturer of dispenser 1. It will be apparent that in practice the logo and/or the brand name of the manufacturer of dispenser 1 is usually legally protected. Printed images 13 on the paper of filling 2 correspond to images stored as reference image in database 11. When the paper moves past camera 7 during dispensing 4 of filling 2, camera 7 will successively form an image of printed image 13a, 13b, 13c, 13d and 13e. Each of these printed images 13a to 13e can be assessed by processor 10 as being the same as a reference image from memory 11. Processor 10 will hereby be able to establish that filling 2 is a genuine filling. When it is found that printed images 13 do not correspond to reference images from memory 11, processor 10 will be able to establish that, because of this difference, the filling is an imitation filling. Processor 10 is preferably programmed here to consider the filling as imitation filling only in the case of a recurring dissimilarity.

FIG. 2 shows an embodiment wherein the camera compares a printed image to a reference image. The skilled person will appreciate that this is only one embodiment and that other visual characteristics which can be detected by a camera can also form the basis of the comparison. Texture of a surface or colour value of a surface could therefore also be compared to a stored reference. Visual characteristics which are not visible to the human eye but which are detectable by a camera (for instance characteristics detectable outside the wavelength spectrum visible to the eye) can also form the basis of the comparison.

Figure 3:
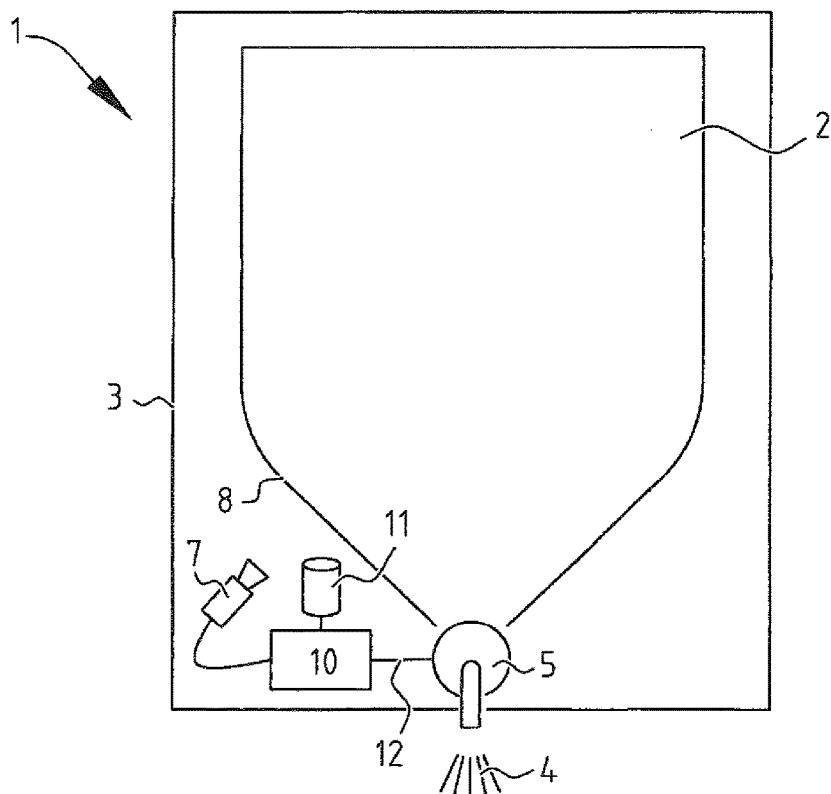
FIG. 3 shows a second embodiment of a dispenser according to the invention with filling.

FIG. 3 shows a second embodiment of a dispenser 1 with a frame 3 provided for the purpose of receiving a filling 2. Dispenser 1 comprises a dispensing mechanism 5 provided for the purpose of carrying a predetermined quantity of filling 4 to the outside. In the second embodiment shown in FIG. 3 the dispenser is a liquid dispenser 1 and the filling is a liquid container 2. Dispensing mechanism 5 is a pump, an atomizer or foamer. Dispenser 1 further comprises a camera 7 directed at a portion 8 of filling 2. Camera 7 here forms an image of portion 8 of filling 2 which is compared by a processor 10 to a reference image in a memory 11. When processor 10 establishes that the image recorded by camera 7 does not correspond to reference image 11, processor 10 sends a stop signal 12 to dispensing mechanism 5 or the processor blocks dispensing mechanism 5 by controlling a blocking element (not shown). In the embodiment of FIG. 3 camera 7 can be directed at a predetermined portion of filling 2 (without filling 2 moving relative to the camera 7). In such a case camera 7 is preferably not a line camera but a CCD or CMOS camera. A procedure can alternatively be defined wherein filling 2 must be rotated in dispenser 1 when filling 2 is placed in dispenser 1. Owing to this rotation the camera 7 will be able to form an image of a larger portion of filling 2 (than just that portion 8 at which camera 7 is directed). In such a case camera 7 can also be a line camera. In such a situation the dispensing mechanism will be blocked during placing of filling 2 when the filling is found to be an imitation filling. This in contrast to the example of FIG. 1 wherein the similarity is not determined immediately upon placing of filling 2 but during dispensing of filling 2.

Figure 4:
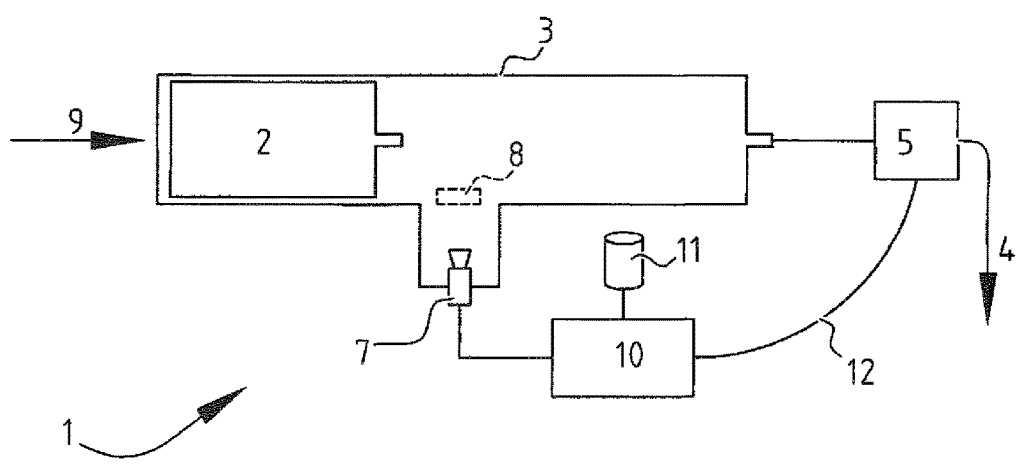
FIG. 4 shows a third embodiment of a dispenser according to the invention with filling.

FIG. 4 shows a further embodiment of a dispenser 1 according to the invention. In this embodiment a filling 2 is placed in a frame 3 of the dispenser. The placing of filling 2 is designated with arrow 9. In the dispenser according to FIG. 4 the camera 7 will form an image of filling 2 during placing 9. This image is compared by a processor 10 to a reference image from a database 11. When an imitation filling 2 is detected because of a dissimilarity between the formed image 7 and reference image 11, a stop signal 12 is sent to dispensing mechanism 5. Examples of dispensers as shown in FIG. 4 are copying machines or printers in which ink or toner fillings are placed. Another example is a portable device in which batteries can be placed, the batteries forming the fillings 2. Another example is a rifle or firearm in which cartridges/bullets are placed as filling. Another example is a can vending machine in which cans are placed as fillings. Bread vending machines/beer vending machines/sweet vending machines and other machines in which goods are placed as filling and dispensed to a user are also suitable for application of the invention. Air fresheners with which a fragrance is periodically blown into a space and into which fragrance fillings are placed can also be embodied in accordance with the invention. Coffee and tea vending machines which operate with filling, such as for instance the Senseo, Nespresso and Special-T types, can further be provided with the invention in order to identify whether the filling is a genuine filling or an imitation filling.

Figure 5:
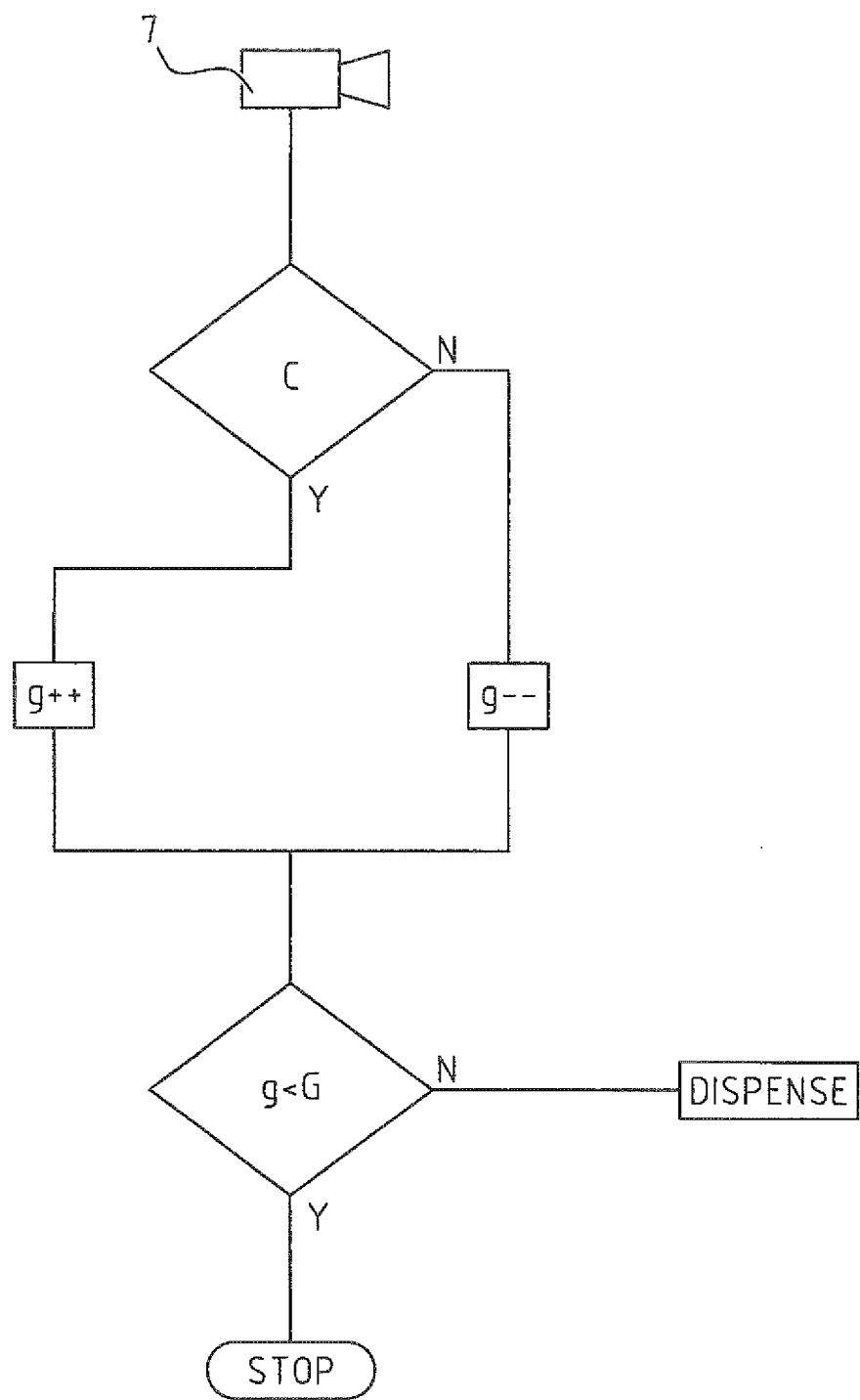
FIG. 5 shows a flowchart of a method for determining a similarity between an image and a reference image.

FIG. 5 shows a flow chart for determining a similarity between an image recorded of a filling 2 and a reference image in a database. When filling 2 is placed in frame 3 of dispenser 1, the similarity is set (or reset) here to a predetermined value (designated g in FIG. 5), for instance 20. A minimal similarity G is predetermined, for instance 10. When dispensing mechanism 5 is operated or when filling 2 is placed in the frame, camera 7 records an image. This image from camera 7 is compared C to a reference image from the database. When this recorded image from camera 7 is found not to correspond (N) to the reference image, similarity g is reduced by a predetermined value (g--), for instance reduced by value 1. When comparison C shows that the image from camera 7 corresponds to the stored reference image (Y), the similarity value g is increased by a predetermined value (g++), for instance 5. The similarity g is then compared to the minimal similarity G. When the similarity is less than the minimal similarity G (Y), a stop signal is sent to dispensing mechanism 5. When the similarity is not less than the predetermined minimal similarity (N), the dispensing mechanism remains active and a predetermined quantity of the filling can thus be dispensed to outside the frame 3. Via such a determination of the similarity the dispensing mechanism is prevented from blocking when one of the printed images 13 is not detected sufficiently clearly by camera 7 to be deemed the same. Such an erroneous blocking would be detrimental to the user as well as to the owner of dispenser 1. Dispenser 1 must after all be able to operate without error with a genuine filling. Error-free operation of the dispenser can be achieved via determining of the similarity as illustrated in FIG. 5.

It will be apparent to the skilled person that the above description describes only several preferred embodiments of the invention and that the invention is not limited to the described embodiments. The different technical features described above can be freely combined and modified by the skilled person without departing from the scope of protection, which is defined solely in the claims.

The invention claimed is:

1. A dispenser comprising a frame suitable for receiving a replaceable filling, wherein the frame comprises a dispensing mechanism for the purpose, when the filling is fitted in the frame, of dispensing a predetermined quantity of the filling outside the frame, characterized in that the dispenser further comprises a camera, a processor and a memory, wherein the camera is placed in the frame such that, when the filling is fitted in the frame, the camera is suitable for forming an image of at least a portion of the filling, wherein at least one predetermined reference image is stored in the memory, and wherein the processor is connected operationally to the camera, the memory and the dispensing mechanism and is provided for the purpose of determining a similarity between said image and said reference image, wherein said similarity is determined over multiple dispensing steps, and wherein the processor is further provided for the purpose of stopping the dispensing mechanism when said similarity lies below a predetermined value, wherein the similarity is calculated by:

defining the similarity at a predetermined initial value when a filling is placed;

subtracting a first predetermined value from the predetermined initial value when the image differs from the reference image during dispensing of a predetermined quantity of the filling; and adding a second predetermined value to the predetermined initial value when the image corresponds to the reference image during dispensing of a predetermined quantity of the filling.

2. The dispenser as claimed in claim 1, wherein the camera is placed in the frame at a distance of at least 1.0 centimeter from said portion of the filling when the filling is fitted in the frame.

3. The dispenser as claimed in claim 1, wherein a light source is provided in the frame for illuminating said portion of the filling when the filling is fitted in the frame.

4. The dispenser as claimed in claim 1, wherein at least said portion of the filling makes a movement in the frame when the dispensing mechanism dispenses the predetermined quantity of the filling.

5. The dispenser as claimed in claim 4, wherein the camera is a line camera which is provided for the purpose of forming an image during said movement.

6. The dispenser as claimed in claim 1, wherein the dispensing mechanism comprises an operating element for the purpose of starting said dispensing of a predetermined quantity of said filling.

7. The dispenser as claimed in claim 6, wherein the operating element comprises an electronic circuit for controlling the dispensing mechanism.

8. The dispenser as claimed in claim 7, wherein the processor is connected operationally to the electronic circuit for the purpose of stopping the dispensing mechanism.

9. The dispenser as claimed in claim 1, wherein the dispenser comprises a blocking element and wherein the processor is provided for the purpose of stopping the dispensing mechanism by controlling the blocking element.

10. The dispenser as claimed in claim 1, wherein the dispenser is a roll dispenser wherein the dispensing mechanism is formed as an unrolling mechanism for unrolling a filling roll in order to dispense a predetermined quantity of sheet-like material from the filling roll to the outside.

11. The dispenser as claimed in claim 10, wherein the camera is directed at the sheet-like material when a filling roll is fitted in the frame.

12. The dispenser as claimed in claim 1, wherein the dispenser is a liquid dispenser wherein the frame is adapted to comprise a liquid container, wherein the camera is directed at the liquid container.

\* \* \* \* \*